(12) United States Patent
Voloschenko et al.

(10) Patent No.: US 7,339,636 B2
(45) Date of Patent: Mar. 4, 2008

(54) COLOR DISPLAY AND SOLAR CELL DEVICE

(75) Inventors: Dmitry Voloschenko, Schaumburg, IL (US); Zili Li, Barrington, IL (US); Huinan J. Yu, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 573 days.

(21) Appl. No.: 10/904,587

(22) Filed: Nov. 17, 2004

(65) Prior Publication Data
US 2005/0117096 A1    Jun. 2, 2005

Related U.S. Application Data

(60) Provisional application No. 60/526,208, filed on Dec. 2, 2003.

(51) Int. Cl.
*G02F 1/1335* (2006.01)
(52) U.S. Cl. .................. 349/61; 349/106; 349/114; 349/116
(58) Field of Classification Search .............. 349/61, 349/62, 106, 113, 114, 116, 179, 187; 345/88, 345/102, 207
See application file for complete search history.

(56) References Cited

U.S. PATENT DOCUMENTS

| | | | |
|---|---|---|---|
| 5,686,979 A * | 11/1997 | Weber et al. ............ | 349/96 |
| 5,905,590 A | 5/1999 | Van Der Sluis et al. .... | 359/275 |
| 6,437,900 B1 | 8/2002 | Cornelissen et al. ........ | 359/246 |
| 2003/0081158 A1 | 5/2003 | Li et al. ..................... | 349/113 |

FOREIGN PATENT DOCUMENTS

| | | |
|---|---|---|
| WO | WO 00/63745 | 4/1999 |
| WO | WO 01/59491 A1 | 8/2001 |

OTHER PUBLICATIONS

Li, Z.; Voloschenko, D.; Smith, M. "Photovoltaic Cell Integrated Into a Reflective LCD" Society for Information Display, 2002 International Symposium, Digest of Technical Papers, vol. XXXIII, No. 1.
Chien, Liang-Chy "A Bistable Reflective Cholesteric Liquid Crystal Display With Pixelated Colors" Liquid Crystal Materials, Devices, And Applications VIII The International Society for Optical Engineering, vol. 4658, Jan. 2002.

* cited by examiner

*Primary Examiner*—Tai Duong

(57) ABSTRACT

A color display and solar cell device (100, 300, 500), and methods for fabricating and operating the device. The device (100, 300, 500) includes a transparent light source (140, 340, 540) located behind a liquid crystal display (105, 305, 505) that includes a switchable transflector layer (145, 345, 545). In a first embodiment, the liquid crystal display (105) also includes a tri-color pixelized filter (115), the switchable transflector (145) is a switchable broadband transflector, and the transparent light source (140) is a white light source. In a second embodiment, the switchable transflector layer (345) is a tri-color selectable transflector and the transparent light source (340) is a tri-color selectable light source. In a third embodiment, the switchable transflector layer is a switchable broadband transflector and the transparent light source is a tri-color selectable light source. In a fourth embodiment, the switchable transflector layer (545) is a switchable pixelized tri-color transflector and the transparent light source (540) is a tri-color selectable light source.

20 Claims, 5 Drawing Sheets

COLOR DISPLAY AND SOLAR CELL DEVICE

CROSS-REFERENCE TO RELATED APPLICATION

This application is related to a co-pending application entitled "COLOR DISPLAY AND SOLAR CELL DEVICE," U.S. Ser. No. 10/205,458 filed on Jun. 25, 2002, assigned to the assignee of the instant application.

BACKGROUND

As multimedia applications become readily available in cellular telephones, the power drain of the telephones increases. This increase in power drain has put a limit on the use of many applications and is one of the challenges facing cellular handset makers. To combat this problem in cellular telephones with monochrome liquid crystal displays, the integration of a solar cell panel behind a STN display to collect ambient light energy for either emergency or standby uses has been described, as in Z. Li et al, "Photovoltaic cell integrated into a reflective LCD", SID Digest-02. This supplementary power source is an integrated part of the monochrome display. However, the monochrome display is rapidly being replaced by color displays, so there is a need for supplementary power for cellular telephones with color displays. Although in some instances, conventional techniques for obtaining supplementary power for monochrome displays provide some supplementary power when used with the types of color displays now in use, recovering a more substantial portion of the energy from the incident light is desirable.

BRIEF DESCRIPTION OF THE DRAWINGS

The present invention is illustrated by way of example and not limitation in the accompanying figures, in which like references indicate similar elements, and in which.

Figure 1:
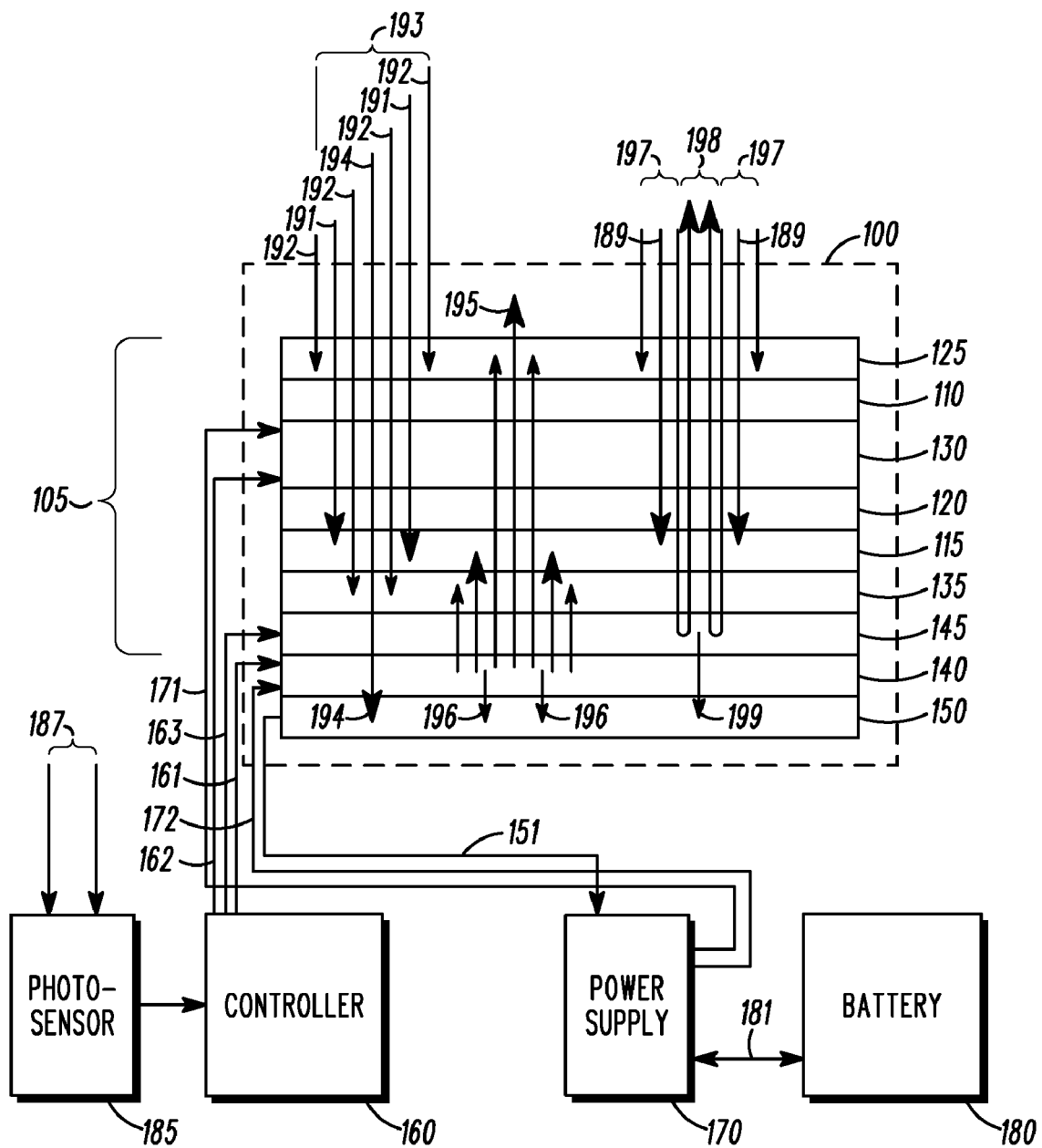
FIG. 1 shows a combined elevation view of an embodiment of a display and solar cell device 100 (herein simply referred to as a device 100) and an electrical block diagram of the device 100 and electrical components, in accordance with a first embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Before describing in detail the particular color display and solar cell in accordance with the present invention, it should be observed that the present invention resides primarily in combinations of method steps and apparatus components related to the color display and solar cell. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

FIG. 1 shows a combined cross sectional elevation view of an embodiment of a display and solar cell device 100 (herein simply referred to as a device 100), and an electrical block diagram of the device 100 and associated electrical components, in accordance with a first embodiment of the present invention. The cross section illustrated in FIG. 1 can be interpreted as one pixel of the device 100. The device 100 comprises a liquid crystal display (LCD) 105, a transparent light source 140, and a solar cell 150. The LCD 105 comprises a substantially transparent front plate 110, an opposing substantially transparent back plate 120, liquid crystal material 130, and electrodes (not shown in FIG. 1), and may comprise a front polarizer 125 and back polarizer 135. The phrase "substantially transparent" means that the plate transmits at least 70% of the visible light energy that is incident on the device 100. For example, the front and back plates 110, 120 can be clear glass which is typically at least 96% transmissive to visible light when the surfaces of the glass are left uncoated. (The addition of transparent electrodes or thin film transistor structures causes some reduction of the transmissivity of the plates 110, 120.) Alternatively, the front and back plates 110, 120 can be of substantially transparent plastic, as is well known to one of ordinary skill in the art. Liquid crystal material 130 fills the space between these two plates 110 and 120 in accordance with well-understood prior art knowledge and technique. In this embodiment, the liquid crystal material 130 preferably comprises either supertwisted nematic or twisted nematic liquid crystal material. Transparent electrodes are placed on the inner surfaces of the front and back plates 110, 120 in a manner well known in the art to form a pattern, or array, of liquid crystal pixels between the front plate 110 and the back plate 120 of the LCD 105, which is to say that individual pixels are capable of being electronically controlled by a conventional display control circuit (not shown in FIGS. 1-2) to determine an amount of rotation of linear polarized light passing therethrough, in a well known manner. The pixels may be patterns of red, green, and blue dots or red, green, and blue lines. The front polarizer 125 is shown in FIG. 1 as being located in front of the front plate 110. It is preferably a linear polarizer that may be bonded to the front plate. The front polarizer 125 may alternatively be a portion of the front plate 110. The back polarizer 135 is preferably a linear polarizer, and can be located substantially parallel to behind the back plate 120 of the liquid crystal display panel, preferably adjacent to the back plate 120. The back polarizer 135 can alternatively be a portion of the back plate 120.

The LCD 105 also comprises a switchable transflector layer 145 that is arranged behind the back plate 120 and a tri-color pixelized filter 115. In accordance with the first embodiment of the present invention, the tri-color pixelized filter 115 is preferably arranged in front of the switchable transflector layer 145. Preferably, the tri-color pixelized filter 115 is behind the back plate 120 and in front of the back polarizer 135, as shown in FIG. 1, but other locations may also work satisfactorily, such as between the back polarizer 135 and the switchable transflector layer 145, or between the liquid crystal material and either the front plate 110 or the back plate 120. The tri-color pixelized filter 115 is fabricated as a color pigment embedded polymer matrix that is patterned on the plates 110, 120 by photolithography when it between the liquid crystal material 130 and one of the plates 110, 120. The tri-color pixelized filter 115 is an array of band pass filter areas that match the pixels formed in the liquid crystal material in accordance with the pattern of the electrodes. Thus, red band pass filter areas correspond to red liquid crystal pixels, etc. The tri-color band pass filter 115 may be any one of several technologies. Examples of tri-color band pass filters comprising conventional materials are cholesteric filters, holographic filters, and plastic film filters. The energy that is incident on the color LCD 105 that is not passed by the tri-color pixelized filter 115 (which is roughly ⅔ of the energy of the ambient light for absorptive color filters and ⅓ of the energy of the ambient light for reflective color filters) is absorbed or reflected by the tri-color pixelized filter 115.

The switchable transflective layer 145 is a layer that comprises a transparent surface electrode on each surface of the layer, and has high broadband light reflectivity, such as greater than 75% at one electrical potential between the surface electrodes, and has high broadband light transmission, such as greater than 80% at another electrical potential. Some aspects of such devices are described in U.S. Pat. No. 6,437,900 issued to Cornelissen et al. on Aug. 20, 2002 and U.S. Pat. No. 5,905,590 issued to Van Der Sluis et al. on May 18, 1999. Thus the switchable transflective layer 145 has one state called a reflective state and another state called a transmissive state, and may be described as a switchable broadband transflector. Such a layer can be formed, for example, from liquid crystal gels, as described in "Electrically switchable mirrors and optical components made from liquid-crystal gels" by R. A. M. Hikmet and H. Kemperman in volume 392 of Nature, published in Apr. 1998, or using tri-valent metals, as described in U.S. Pat. No. 6,437,900 issued to Cornelissen et al. on Aug. 20, 2002.

The transparent light source 140 is preferably a panel light source that can emit a broadband source of light (i.e., it provides a substantially white appearing light using at least three narrow band primary colors of the spectrum), with a significant portion directed forward through the back of the LCD 105 toward the front of the LCD 105, where a portion 195 is emitted. Thus the transparent light source 140 can be described as a white light source. The portion transmitted is determined by the tri-color pixelized filter 115, the state of the liquid crystal material 130 at each pixel, and the attenuations caused by the switchable transflector layer 145 when it is in the transmissive state, the front and back polarizers 125, 135, and the front and back plates 110, 120. The transparent light source 140 is at least semi-transparent (e.g., at least approximately 20% transmissive to broad band light including visible and short wave infra-red light that is incident on the front of the transparent light source), and more preferably such that a substantial percentage of 194, for example at least 50%, of ambient light 193 that is incident on the front of the light source 140 passes through the transparent light source 140 to the solar cell 150, particularly when the light source 140 is off. It is described as a panel light source to emphasize that the light intensity is substantially uniform over the area of the LCD 105. The transparent light source 140 may be of any suitable technology that is at least semi transparent and emits a broadband light beam of sufficient intensity to achieve the desired brightness. For example, it may be a light pipe that guides light from one or more light emitters to the back of the LCD 105. The emitters may, for example, be light emitting diodes (LEDs), or lasers that emit light from point sources. The LEDs or lasers may be narrow band red, green, and blue emitters whose light beams are merged to form broad band light. The light pipe then guides and spreads the light so that it is substantially uniform over the area of the LCD 105. An example of transparent light source is a reversely placed transparent front light source for LCDs that is used in many conventional devices.

In an alternative embodiment, the transparent light source 140 is implemented using materials that are essentially transparent and that emit light directly from an area equivalent to the area of the LCD 105. An example of this type of transparent light source 140 would be a tri-color organic light emitting display panel driven with appropriate brightness at each pixel to produce light that appears to be substantially white.

The solar cell 150 is disposed behind the back of the LCD 105, and a coupling layer (not shown in FIG. 1) joins the solar cell 150 to the transparent light source 140, which is likewise coupled to the back of the LCD 105. The coupling layer can be, for example, comprised of an appropriate transparent adhesive material as appropriate to a particular application. If desired, and depending upon the area of the liquid crystal display 105 and/or a desired electrical configuration, multiple solar cells 150 can be utilized.

The solar cell 150 has a light receiving active surface as understood in the art. For most applications, the appearance of the device 100 will be enhanced if the light receiving active surface has a uniform appearance and typically a dark-colored appearance. For most applications, a black or substantially black colored non-reflecting surface will be optimum.

The device 100 may be coupled to a controller 160, a photosensor 185, a power supply 170, and a battery 180. In some instances the device 100 may be fabricated for sale including the controller 160 and/or the photosensor 185 and/or the power supply 170. The controller 160, for example, may comprise a single integrated circuit that includes embedded program instructions and input/output controls lines, may comprise an application specific integrated circuit, or may comprise a combination of portions of conventional microprocessor integrated circuits. The controller 160 is coupled to the electrodes of the LCD 105 by signal 162. The electrodes, some of which may be coupled to thin film transistors, may be conventional column and row matrixed electrodes for conducting electrical potentials of the signal 161 that control the transmissivity of each pixel, thereby causing information to be presented on the LCD 105 under control of the controller 160 in a well known manner. The controller 160 may also coupled to the transparent light source 140 by signal 161, and may cause the transparent light source 140 to generate the broadband light beam that is spread substantially uniformly over the area of the LCD 105, when the LCD 105 is on (i.e., in a state in which information can be displayed on the LCD 105) and the ambient light level is low. In an alternative embodiment, the transparent light source 140 is not coupled to the controller 160 and is controlled more directly by an output of the photosensor 185 or by a user action, such as setting a switch. In some cases, the solar cell 150 can also function as the photosensor 185.

Figure 2:
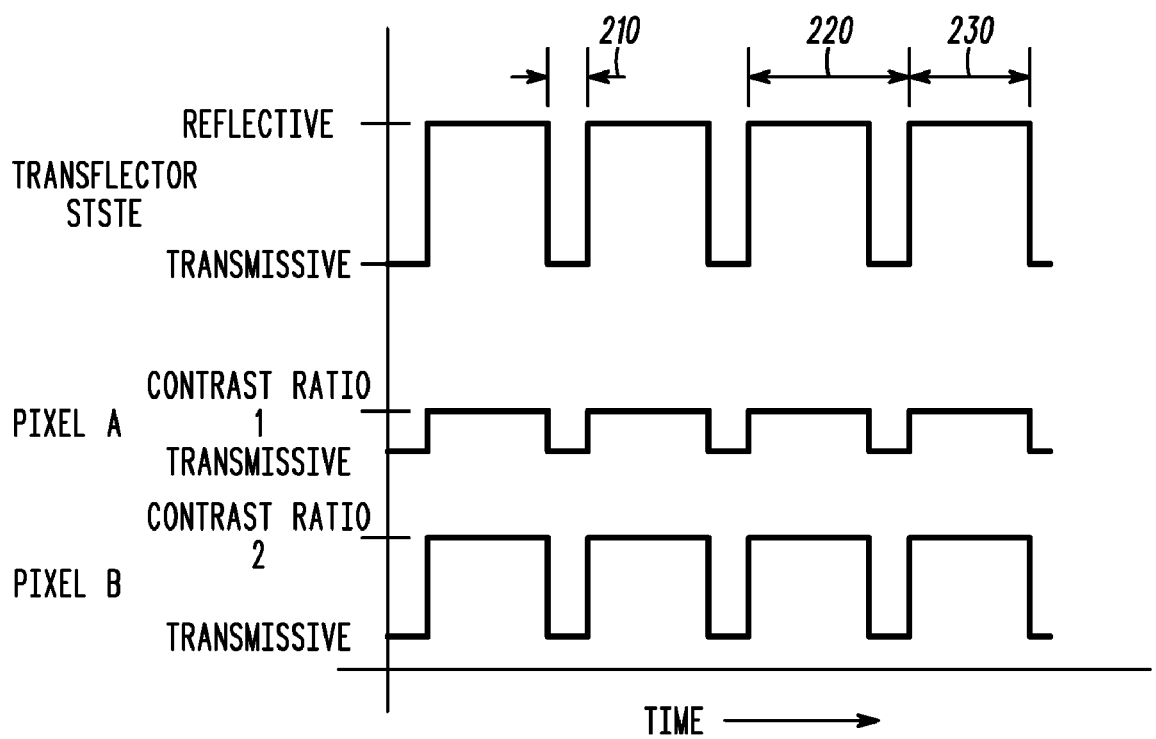
FIG. 2 is a timing diagram that shows states of the switchable transflector layer and two pixels of the liquid crystal material for three periods of display states, in accordance with the first embodiment of the present invention.

Referring to FIG. 2, a timing diagram shows states of the switchable transflector layer 145, and two pixels of the liquid crystal material 130 for three periods 220 of display states when the LCD 105 is being operated by the controller 160 (i.e., is on and can be used for the presentation of information) in a high ambient light situation, such as daylight. In this mode, the controller 160 uses signal 163 to switch the switchable transflector layer 145 between a reflective state and a transmissive state at a rate that avoids flicker of the LCD 105, with a period that is typically at least 25 times per second, and sets the transparent light source off. This is illustrated in the top state diagram of FIG. 2, in which the period 220, the transmissive state duty cycle 210, and the reflective state duty cycle 230 are shown. The period 220 is the reciprocal of the rate so it is, at most, $\frac{1}{25}$th of a second. Simultaneously, the controller 160 may set the electric potential of all pixels of the liquid crystal material 130 to achieve the polarization state that passes the most light through the back polarizer 135. This is also described as setting the liquid crystal material to the most transmissive polarization state. This is illustrated in the bottom two state diagrams of FIG. 2, in which pixel A has a contrast ratio of 1 during the reflective state duty cycle 230 and pixel B has contrast ratio 2 during the reflective state duty cycle 230, while both pixels A and B are set to permit the most light transmission through the back polarizer 135 during the transmissive state duty cycle 210. The LCD 105 is operated in the well known reflective mode when the switchable transflector layer 145 is placed in the reflective state by the controller 160, and when the switchable transflector layer 145 is placed in the transmissive state a significant portion of the incident light is absorbed by the solar cell 150 and converted to electrical energy.

In the reflective state, the incident light 197 passes through layers of the LCD 105, including the tri-color pixelized filter 115, in which light 189 that is not in the narrow band associated with a pixel is absorbed. The portion of the light that is within the narrow band of the tri-color pixelized filter that is associated with the pixel is passed through and reflects off the transflective filter, and a portion 198 of the reflected light emits from the front of the LCD display, as largely determined by the polarization setting of the liquid crystal material 130 at the pixel. The switching is preferably done with a transmissive state duty cycle 210 that is increased in response to increased ambient light intensity. This may be provided in some embodiments of the color display and solar cell 150 by a user control that sets the duty cycle. In another embodiment, the controller 160 responds to light intensity 187 sensed by the photosensor 185 and increases the transmissive state duty cycle (thereby decreasing the reflective state duty cycle) when the ambient light intensity is within a predetermined range. The predetermined range can be from an ambient light intensity threshold that separates night operation from day operation up to a maximum measurable ambient light intensity, and may be limited by response time limits of the LCD 105. For example, when the duty cycle is 50% and the period is $\frac{1}{25}$th of a second, the response time of the LCD 105 should be sufficient to provide a steady state contrast ratio during most of $\frac{1}{50}$th of a second.

As the duty cycle is lowered, the response of the LCD 105 needs to be faster. It is preferable that the response time be sufficient to allow for a 25% duty cycle, for which the on time is approximately $\frac{1}{100}$th of a second. This may allow for a duty cycle that ranges from 25% to over 75%. Thus, the LCD 105 is preferably a relatively fast responding LCD, using techniques similar to those used for color video imaging to achieve the types of response times mentioned. The duty cycle is typically set to provide satisfactory readability for most users while at the same time maximizing the transmissive state duty cycle and staying within a duty cycle range permitted by the response time of the LCD 105. Therefore, when the LCD 105 is on in a high ambient light situation, the portion 194 of ambient light energy that is incident 193 on the front of the LCD display that passes to the solar cell 150 is determined by losses 192 in the plates 110, 120, polarizers 125, 135, liquid crystal material 130 and any other layers in the LCD 105, the absorption filter loss 191 in the tri-color pixelized filter 115, as well as losses that vary between the reflective and transmissive duty cycle. In the transmissive state, the variable loss through the switchable transflector layer 145 becomes quite low, and the significant portion 194 that passes to the solar cell 150 is converted to supplemental electrical power by the solar cell 150 and coupled to the power supply 170 by signal 151. It will therefore be appreciated that in high ambient light conditions, the present invention allows a significant production of supplemental power as well as satisfactory readability of the LCD.

When the LCD 105 is on in a low ambient light situation, such as in moonlight or room light, the controller 160 may set the switchable transflector layer 145 to the transmissive state and turn on the transparent light source 140. In another embodiment, these settings may be controlled more directly from the photosensor 185 or by operator action. Information is then presented on the LCD 105 in accordance with well known principles for backlit LCD displays. Some portion 196 of the light emitted by the transparent light source 140 may emit towards the solar cell 150, and some portion of the low intensity ambient light incident on the front of the device 100 may pass through the LCD 105 to the solar cell 150, in which case some amount of the light energy may be converted to electrical energy that can be used or stored as supplemental power.

When the LCD 105 is turned off by the controller 160 (i.e., the controller 160 is not coupling information to the LCD 105), the controller 160 sets the switchable transflector layer 145 to the transmissive state and turns off the transparent light source 140. The controller 160 may also set the liquid crystal material 130 to the most transmissive back directed polarization state. When the LCD 105 is off, a significant portion of the ambient light that is incident on the front of the LCD 105 may pass through the LCD 105 to the solar cell 150, in which case the light energy may be converted to electrical energy that can be used or stored as supplemental power.

The power coupled to the power supply 170 is modified appropriately so that it can be coupled back to one or more of the LCD 105 by signal 171, the transparent light source 140 by signal 172, or the battery 180 by signal 181. The supplemental energy can be stored in the battery 180 or distributed to other electronic components that may be in an apparatus that includes the device 100. The supplemental energy is modified, for example, by the power supply 170 for charging the battery 180. Examples of apparatuses that may include the device 100 are cellular telephones, portable games, personal digital assistants, and other personal electronic apparatuses that run on batteries.

A summary of some aspects of the first embodiment of the present invention is that the first embodiment comprises a tri-color pixelized filter 115 that is arranged in front of the switchable transflector layer 145. The switchable transflector layer 145 is a switchable broadband transflector and the transparent light source 140 is a white light source. The controller 160 provides color pixel information to the liquid crystal display 105 when the color display and solar cell device 100 is operated in a reflective mode (during which the controller 160 sets the switchable transflector 145 to the reflective state).

Figure 3:
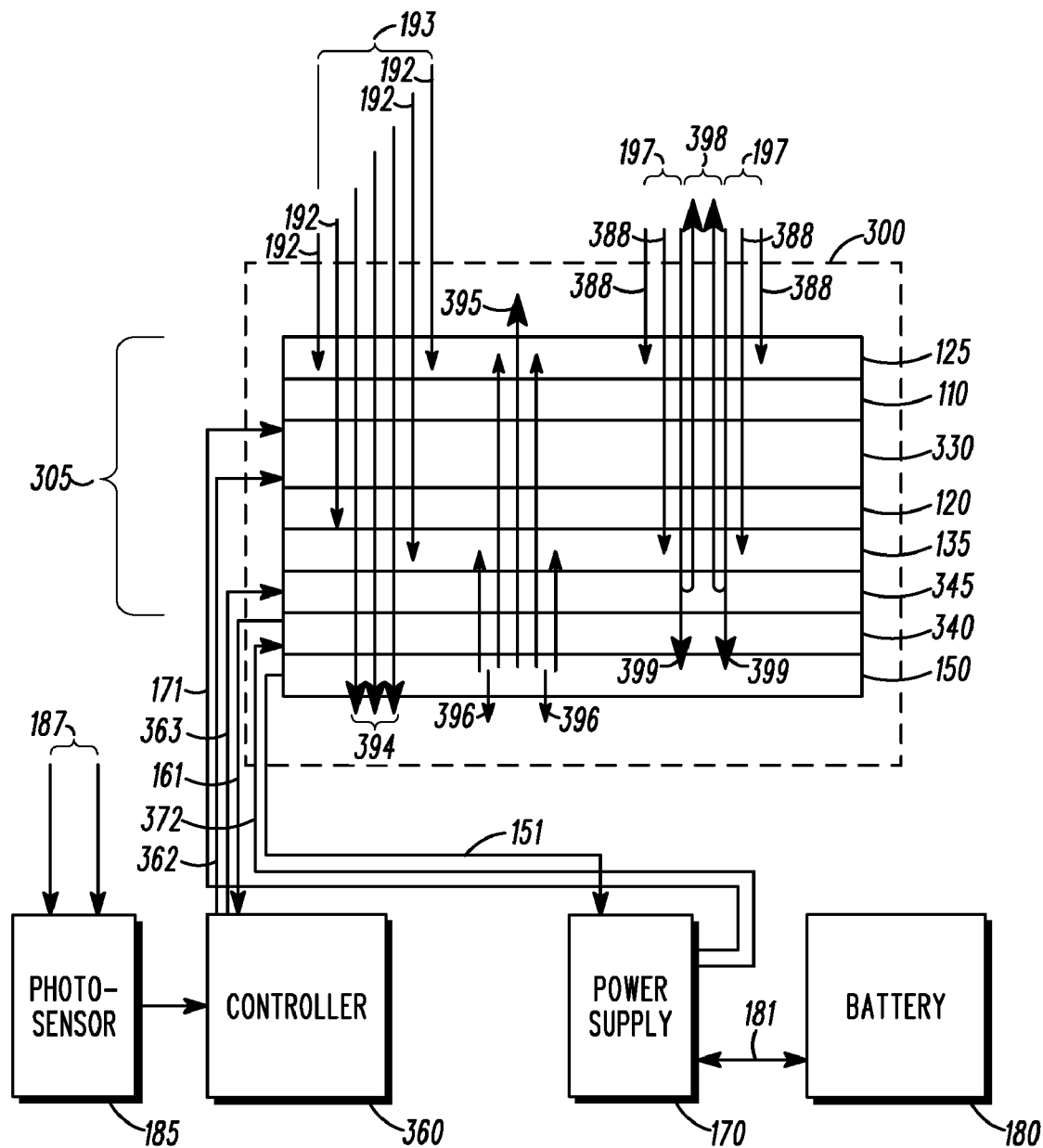
FIG. 3 shows a combined elevation view of an embodiment of a display and solar cell device 300 (herein simply referred to as a device 300) and an electrical block diagram of the device 300 and electrical components, in accordance with a second embodiment of the present invention.

Referring to FIG. 3, a combined cross sectional elevation view of an embodiment of a display and solar cell device 300 (herein simply referred to as a device 300), and an electrical block diagram of the device 300 and associated electrical components is shown, in accordance with a second embodiment of the present invention. The cross section illustrated in FIG. 3 can be interpreted as one pixel of the device 300. The second embodiment of the present invention is similar to the first embodiment in many respects. Among the differences are a different type of switchable transflector layer 345, no tri-color pixelized filter 115, a different type of transparent light source 340, and a different operation performed by the controller 360.

The controller 360 may be the same processor as used for the controller 160 used in the first embodiment, but with the stored programs altered as needed to accomplish the changes described below.

The switchable transflector layer 345 in this embodiment is a tri-color selectable transflector layer. When it is in the reflective state, it operates as a panel reflector that can be selected to reflect narrow band light having one of three colors (preferably red, green, and blue), with substantially uniform reflection of the selected color over the active surface of the switchable transflector layer 345. Light that is not within the narrow band is transmitted through the switchable transflector layer 345 without substantial attenuation. Such a layer can be formed by stacking narrow band switchable transflectors, for example, made from liquid crystal gels, as described in "Electrically switchable mirrors and optical components made from liquid-crystal gels" by R. A. M. Hikmet and H. Kemperman in volume 392 of Nature, published in Apr. 1998. When in the reflective state, a substantial portion of the light that is incident 197 on the device 300 and that is within the narrow color band that is selected is reflected 398. The polarization of the reflected light is rotated by the liquid crystal material 330 according to the electric field across the liquid crystal material 330 that is determined by the controller 360 and induced by means of the electrodes, to form the presentation of a portion of full color information that is for one primary color on the LCD 305, which can be described as a monochrome sub-frame of information.

The controller 360 sequentially provides monochrome sub-frames of information to the LCD 305 via signal 362 for each of the three primary colors and synchronously selects the corresponding three reflective states for the switchable transflector layer 345, at a frame rate of at least 25 per second, or a subframe rate of 75 per second. Thus, the LCD 305 should have a response time sufficient to provide good contrast when operated at a switching rate of at least 75 subframes per second. A very substantial portion of the light that is incident 197 on the device 300 and that is outside the narrow color band that corresponds to the selected color is transmitted 399 through the switchable transflector layer 345 during each sub-frame, and thence into the solar cell 150, where it can be converted to supplemental electrical energy. For example, if a sub-frame is a green sub-frame, then substantially all red and blue light, as well as some portion of infra-red and ultraviolet light, will pass through the switchable transflector layer 345 with little attenuation when it is in the reflective state. When it is in the transmissive state, then substantially all visible light, as well as some portion of infra-red and ultraviolet light, will pass through the switchable transflector layer 345 with little attenuation.

The transparent light source 340 is preferably a tri-color selectable light source that can emit one of three selected narrowband sources of light (preferably red, green and blue), with a significant portion directed forward through the back of the LCD 305 toward the front of the LCD 305, where a substantial portion 395 is emitted as determined by the state of the liquid crystal material 330 at each pixel and the attenuations caused by the switchable transflector layer 345 when it is in the transmissive state, the front and back polarizers 125, 135, and the front and back plates 110, 120. The transparent light source is at least semi-transparent (e.g., at least approximately 20% transmissive to broad band light including visible and short wave infra-red light), and more preferably such that a substantial percentage 394, for example at least 50%, of ambient light that is incident 193 on the front of the light source 340 passes through the transparent light source 340 to the solar cell 150, particularly when the light source 340 is off. It may be further described as a panel light source to emphasize that the light intensity is substantially uniform over the area of the LCD 305. The transparent light source 340 may be of any suitable technology that is at least semi transparent and selectively emits one of three narrow, primary light beams of sufficient intensity to achieve the desired contrast ratio. For example, it may be a light pipe that guides light from one or more light emitters to the back of the LCD 305. The emitters may, for example, be light emitting diodes (LEDs), or lasers The LEDs or lasers may be a plurality of each of narrow band red, green, and blue emitters whose light beams of one color are merged to form narrow band light of sufficient intensity. The light pipe then guides and spreads the narrow band light so that it is substantially uniform over the area of the LCD 305. The transparent light source 340 must be able to be switched at a rate of 75 frames per second while providing the narrow band light at sufficient intensity.

In an alternative embodiment, the transparent light source 340 is implemented using materials that are essentially transparent and that emit light directly from an area equivalent to the area of the LCD 305. An example of this type of transparent light source 340 would be a tri-color organic light emitting display panel with each primary color selectively driven with appropriate brightness.

In this second embodiment of the present invention, the controller 360 switches the reflective states of the switchable transflector layer 345 at the above mentioned rate of 75 times or more per second, but switches between this sequential reflective state and the transflective state in a non-synchronous and generally static manner. Thus, the controller 360 may simply switch the switchable transflector layer 345 between sequential reflective states and the transmissive state in response to a user input, or the photosensor 185 can be used to determine a threshold at which such switching occurs. However, in another embodiment, the switching method of the first embodiment might be combined with the switching arrangement of the second embodiment to achieve higher supplemental energy recovery when there is relatively high ambient light. That is, during appropriate ambient light conditions, the state of the switchable transflector layer 345 could be switched between the three colors and then to the transmissive state, wherein the transmissive duty cycle is a portion of a $\frac{1}{25}$th second or shorter period. (The LCD 305 would then have to be rated at a higher switching rate to achieve the same frame period.)

Thus, in the second embodiment when the ambient light condition is high and the LCD 305 is on (which is also described herein as the device 300 operating in the reflective mode), the controller 360 sequences the switchable transflector layer 345 through the three reflective states and sets the transparent light source 340 off. Of the ambient light 197 that is incident on the front of the device 300, a small percentage 388 is absorbed by layers of the LCD 305 that include the front and back polarizers 125, 135. Of the remaining light that reaches the switchable transflector layer 345, a portion 398 of the light energy that is in the presently selected narrow band (the color) of the switchable transflector layer 345 is reflected to the front of the LCD 305 with an intensity determined by the electric field across the liquid crystal material 330 at each pixel, but with some additional small amount of loss by absorption through the layers of the LCD 305. Of the remaining light that reaches the switchable transflector layer 345, another portion 399 of the light —that which is not the color of the switchable transflector layer 345—is substantially passed through the switchable transflector layer 345 and the transparent light source 340 to the solar cell 150, where it is converted to supplemental electrical energy. Thus, in the sequential reflective state, a substantial portion of the ambient light that is incident on the device 300 can be used to generate supplemental electrical energy. It can be seen that the substantial portion is at least about ⅔ of the light energy that is incident on the switchable transflector layer 345, reduced by small losses in the transparent layers of the LCD 305 and the transparent light source 340.

When the ambient light condition is low and the LCD 305 is on, the controller 360 sets the switchable transflector layer 345 to the transmissive state and controls the transparent light source 340 in a sequential emitting state for which the three primary colors are sequentially emitted within ½5th or less of a second. Thus, each color is emitted for no more than ⅟75th of a second Although there will typically not be much ambient light energy available for conversion to supplemental power, a large percentage of whatever ambient light is incident on the front of the device 300 will pass through to the solar cell 150, allowing some generation of supplemental light energy. Also, as for the first embodiment, whatever portion 396 of the light generated by the transparent light source 340 that is emitted towards the solar cell 150 can also be converted to supplemental electrical energy.

When the LCD 305 is off, the controller 360 sets the switchable transflector layer 345 to the transmissive state and sets the transparent light source 340 to off. A large percentage of whatever ambient light is incident on the front of the device 300 will pass through to the solar cell 150, allowing generation of supplemental light energy in proportion to the ambient light intensity.

A summary of some aspects of the second embodiment of the present invention is that the second embodiment comprises a controller 360 coupled to the switchable transflector layer 345 and to the transparent light source 340. The switchable transflector layer 345 is a tri-color selectable transflector and the transparent light source 340 is a tri-color selectable light source. The controller 360 sequentially provides monochrome sub-frames of color information to the liquid crystal display 305 when the liquid crystal display 305 is on. The controller 360 synchronously selects corresponding reflective states for the switchable transflector layer 345 at a frame rate of at least 25 per second when the color display and solar cell device 300 is operated in a reflective mode and synchronously selects corresponding colors for the transparent light source 340 at a frame rate of at least 25 per second when the color display and solar cell device 300 is operated in a transmissive mode (during which the controller sets the switchable transflector 345 to the transmissive state).

Figure 4:
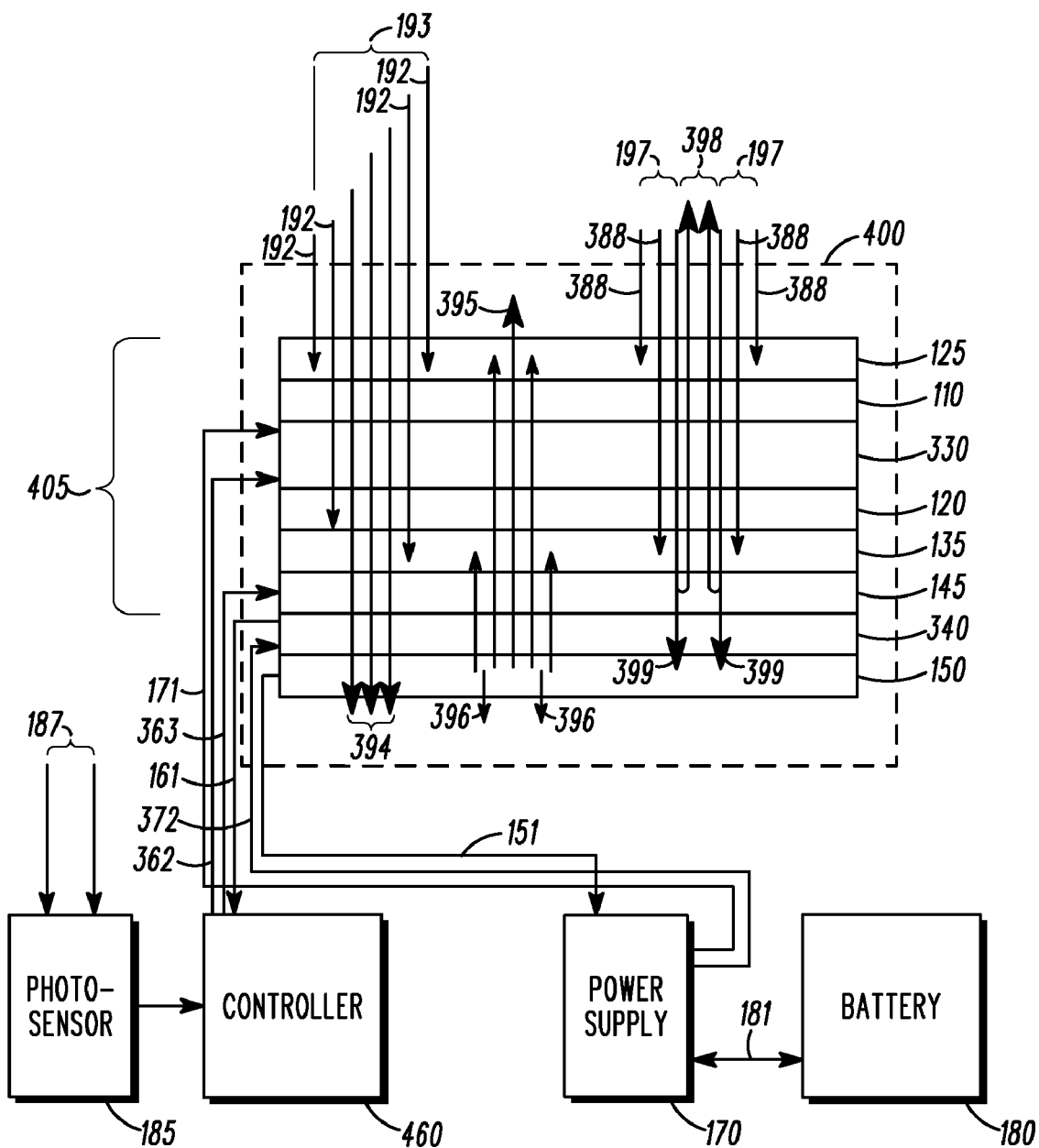
FIG. 4 shows a combined elevation view of an embodiment of a display and solar cell device 400 (herein simply referred to as a device 400) and an electrical block diagram of the device 400 and electrical components, in accordance with a third embodiment of the present invention.

Referring to FIG. 4, a combined cross sectional elevation view of an embodiment of a display and solar cell device 400 (herein simply referred to as a device 400), and an electrical block diagram of the device 400 and associated electrical components is shown, in accordance with a third embodiment of the present invention. The cross section illustrated in FIG. 4 can be interpreted as one pixel of the device 400, in which the switchable transflector layer is essentially the same as the switchable transflector layer 145; i.e., it is a broadband reflector when in the reflection state. In this third embodiment, when the device 400 is operated in the reflection mode, the information coupled to the pixels of the LCD 405 by the controller 460 is coupled as gray scale information and there is no synchronous monochrome sequencing of the information and the switchable transflector layer 145; the image is a gray scale image.

An option in both the second or third embodiments when the device 300, 400 is in the reflective mode is to switch the switchable transflector layer 345, 145 between the sequential reflective state (second embodiment) or reflective state (third embodiment) and transmissive state with a period of ½5th of a second or shorter and with a transmissive duty cycle, allowing some collection of supplemental energy by the solar cell 150, as in the first embodiment, during relatively high ambient light conditions.

The operation in the static transmissive mode used for lower light conditions in this third embodiment is as described for the second embodiment. This third embodiment is simpler and less expensive but provides full color only in the transmissive mode.

A summary of some aspects of the third embodiment of the present invention is that the third embodiment comprises a controller 460 coupled to the switchable transflector layer 145 and to the transparent light source 340. The switchable transflector layer 145 is a broadband transflector layer and the transparent light source 340 is a tri-color selectable light source. The controller 460 provides gray scale frames of information to the liquid crystal display 405 when the color display and solar cell device is operated in a reflective mode and sequentially provides monochrome sub-frames of color information to the liquid crystal display 405 and synchronously selects corresponding reflective states for the switchable transflector layer 145 at a frame rate of at least 25 per second when the color display and solar cell device 400 is operated in a transmissive mode.

Figure 5:
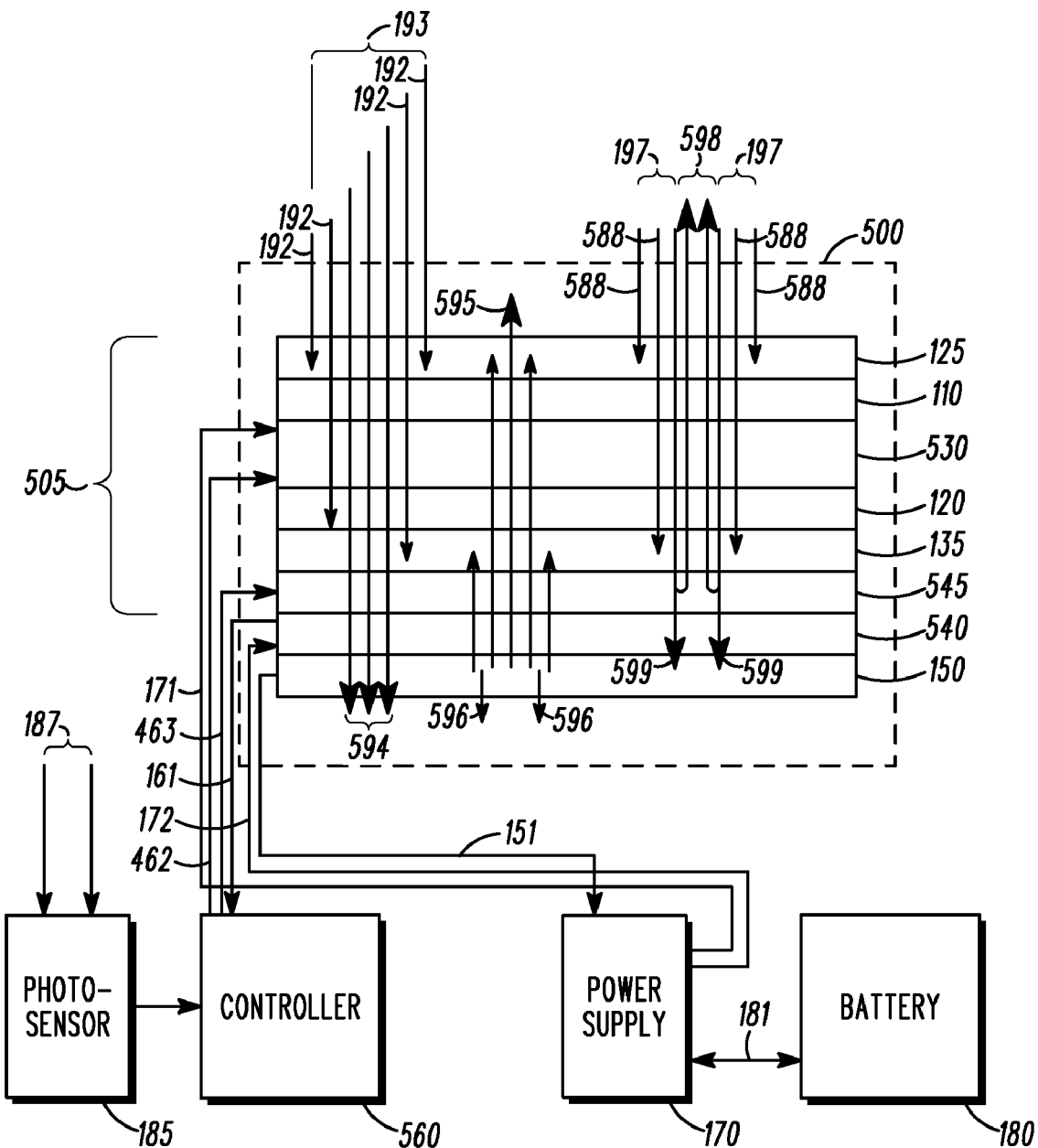
FIG. 5 shows a combined elevation view of an embodiment of a display and solar cell device 500 (herein simply referred to as a device 500) and an electrical block diagram of the device 500 and electrical components, in accordance with a fourth embodiment of the present invention.

Referring to FIG. 5, a combined elevation view of an embodiment of a display and solar cell device 500 (herein simply referred to as a device 500), and an electrical block diagram of the device 500 and associated electrical components is shown, in accordance with a fourth embodiment of the present invention. The fourth embodiment of the present invention is similar to the first embodiment in many respects. Among the differences are a different type of switchable transflector layer 545, no tri-color pixelized filter 115, a different type of transparent light source 540, and a different operation performed by the controller 560.

The controller 560 may be the same processor as used for the controller 160 used in the first embodiment, but with the stored programs altered as needed to accomplish the changes described below.

The switchable transflector layer 545 in this embodiment is a pixelized tri-color transflector layer. When it is in the reflective state, the switchable transflector layer 545 operates as a pixelized tri-color reflector that reflects, at each pixel, narrow band light having one of three colors (preferably red, green, and blue). Such a layer can be formed, for example, as described in "A Bistable Reflective Cholesteric Liquid Crystal Display with Pixilated Colors" by Julie Cho and others, published in Proceedings of SPIE Vol.4658 (2002) Page 12-19. The pixel areas correspond to the pixels of the LCD 505. When in the reflective state, a substantial portion of the light that is incident 197 on the device 500 and that is within the narrow color band that corresponds to the pixel location is reflected 598 at each pixel. The polarization of the reflected light is rotated by the liquid crystal material 530 according to the electric field across the liquid crystal material 530 that is determined by the controller 560 and induced by means of the electrodes, to form the presentation of information on the LCD 505, in the well known technique used in reflective displays. Because the switchable transflector layer 545 is pixelized and tri-color, a very substantial portion of the light that is incident 197 on the device 500 and that is outside the narrow color band that corresponds to the pixel location is transmitted 599 through the switchable transflector layer 545 at each pixel, and thence into the solar cell 150, where it can be converted to supplemental electrical energy. For example, if a pixel is a green pixel, then substantially all red and blue light, as well as some portion of infra-red and ultraviolet light, will pass through the switchable transflector layer 545 with little attenuation when it is in the reflective state. When it is in the transmissive state, then substantially all visible light, as well as some portion of infra-red and ultraviolet light, will pass through the switchable transflector layer 545 with little attenuation.

The transparent light source 540 is preferably a tri-color selectable light source with a significant portion of the narrow band light directed forward through the back of the LCD 505 toward the front of the LCD 505, where a portion 595 is emitted as determined by the state of the liquid crystal material 530 at each pixel. The pixel areas correspond to the pixels of the LCD 505. The transparent light source 540 is transparent, such that a substantial percentage 594, for example at least 50%, of ambient light that is incident on the front of the light source 540 passes through the transparent light source 540 to the solar cell 150, particularly when the light source 540 is off. In the case of this fourth embodiment of the present invention, more of the ambient light that is incident 193 on the front of the device 500 passes to the light source 540 because there is no tri-color pixelized filter 115. The transparent light source 540 may be of any suitable technology that is transparent and provides a tri-color light beam of sufficient intensity to achieve the desired brightness. An example of this type of transparent light source 540 would be a lightguide with red, green and blue point light sources.

In this fourth embodiment of the present invention, the controller 560 need not perform the rapid switching of reflective and transflective states as is done in the first embodiment of the present invention, because the amount of light that passes through to the solar cell 150 in the reflective state permits a recovery of substantial amounts of supplemental electrical energy. Thus, the controller 560 may simply switch the switchable transflector layer 545 between reflective and transmissive states in response to a user input, or the photosensor 185 can be used to determine a threshold at which such switching occurs. However, the duty cycle switching method of the first embodiment may be combined with the physical arrangement of the fourth embodiment to achieve higher supplemental energy recovery.

Thus, when the ambient light condition is high and the LCD 505 is on, the controller 560 sets the switchable transflector layer 545 to the reflective state and sets the transparent light source 540 off. Of the ambient light 197 that is incident on the front of the device 500, a small percentage 588 is absorbed by layers of the LCD 505 that include the front and back polarizers 125, 135. Of the remaining light that reaches the switchable transflector layer 545, a portion 598 of the light energy that is within the narrow band (the color) of the switchable transflector layer 545 at a pixel is reflected to the front of the LCD 505 with an intensity determined by the electric field across the liquid crystal material 530, but with some additional small amount of loss by absorption through the layers of the LCD 505. Of the remaining light that reaches the switchable transflector layer 545, another portion 599 of the light—that which is not the color of the switchable transflector layer at the pixel—is passed through the switchable transflector layer 545 and the transparent light source 540 to the solar cell 150, where it is converted to supplemental electrical energy. Thus, in the reflective state, a substantial portion of the ambient light that is incident on the device 500 can be used to generate supplemental electrical energy. It can be seen that the substantial portion is at least about ⅔ of the light energy that is incident on the switchable 545 layer, reduced by small losses in the transparent layers of the LCD 505 and the transparent light source 540.

When the ambient light condition is low and the LCD 505 is on, the controller 560 sets the switchable transflector layer 545 to the transmissive state and sets the transparent light source 540 on. Although there will typically not be much ambient light energy available for conversion to supplemental power, a large percentage of whatever ambient light is incident on the front of the device 500 will pass through to the solar cell 150, allowing some generation of supplemental light energy. Also, as for the first embodiment, whatever portion 596 of the light generated by the transparent light source that is emitted towards the solar cell 150 can also be converted to supplemental electrical energy.

When the LCD 505 is off, the controller 560 sets the switchable transflector layer 545 to the transmissive state and sets the transparent light source 540 to off. A large percentage of whatever ambient light is incident on the front of the device 500 will pass through to the solar cell 150, allowing generation of supplemental light energy in proportion to the ambient light intensity.

It will be appreciated that in the fourth embodiment, if the display is not intended for color video operation, the response time of the LCD 505 can be quite slow in comparison to the first and second embodiments.

A summary of some aspects of the fourth embodiment of the present invention is that the fourth embodiment comprises a controller 560 coupled to the switchable transflector layer 545 and to the transparent light source 540. The switchable transflector layer 545 is a switchable pixelized tri-color transflector and the transparent light source 540 is a tri-color selectable light source. The controller 560 provides color pixel information to the liquid crystal display 505 when the liquid crystal display 505 is on and the switchable transflector is in one of the reflective and transmissive states.

It will be further appreciated the solar cell 150 may be implemented as a plurality of solar cells that are planarly arranged to have a combined surface area substantially equivalent to the area of the LCD 105, 305, 405, 505.

Thus the present invention optimizes the amount of energy that is obtained under varying ambient light conditions for the embodiments of the present invention described with reference to color display and solar cell devices 100, 300, 400, 500.

It will be appreciated that the color display and solar cell devices 100, 300, 400, 500 described herein can be beneficially used in a wide variety of portable electronic devices, such as watches, calculators, personal digital assistants, handheld telephones, remote controls, and personal music devices, as well as electronic devices that may not be moved but use moderate amounts of electrical power and can be sustained by batteries and the energy of incident light for a long time, such as a desktop calculator.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The terms "including" and/or "having", as used herein, are defined as comprising. The term "coupled", as used herein with reference to electro-optical technology, is defined as connected, although not necessarily directly, and not necessarily mechanically.

The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. A color display and solar cell device, comprising:
   a liquid crystal display, comprising
   a front plate,
   a back plate,
   a liquid crystal material between the front and back plates, and
   a switchable transflector layer located behind the liquid crystal material;
   a transparent light source behind the liquid crystal display; and
   a solar cell behind the transparent light source that converts a portion of ambient light energy that is incident on the liquid crystal display into electrical energy.

2. The color display and solar cell device according to claim 1, wherein the transparent light source transmits at least 20% of incident light on the front of the transparent light source.

3. The color display and solar cell device according to claim 1, wherein the transparent light source comprises a light pipe that guides light from one or more light emitters to the liquid crystal display.

4. The color display and solar cell device according to claim 1, wherein the transparent light source comprises organic light emitting diodes.

5. The color display and solar cell device according to claim 1, wherein the liquid crystal material is one of a twisted nematic and a super twisted nematic liquid crystal material.

6. The color display and solar cell device according to claim 1, further comprising a controller coupled to the switchable transflector layer, wherein the controller sets the switchable transflector layer to a transmissive state when the liquid crystal display is off.

7. The color display and solar cell device according to claim 6, wherein the controller is further coupled to the liquid crystal material and the controller sets pixels of the liquid crystal material that are in other than a most transmissive back directed polarization state during a reflective duty cycle to the most transmissive back directed polarization state when the liquid crystal display is off.

8. The color display and solar cell device according to claim 1, further comprising a controller coupled to the switchable transflector layer, wherein the controller switches the switchable transflector layer between a reflective state and a transmissive state at least 25 times per second when the liquid crystal display is on.

9. The color display and solar cell device according to claim 8, wherein the controller is further coupled to the liquid crystal material and the controller sets pixels of the liquid crystal material that are in other than a most transmissive polarization state during a reflective duty cycle to the most transmissive polarization state during the transmissive state.

10. The color display and solar cell device according to claim 8, further comprising a photosensor coupled to the controller, wherein the controller switches the switchable transflector layer between the reflective state and the transmissive state with a transmissive state duty cycle that is increased in response to increased ambient light intensity sensed by the photosensor when the ambient light intensity is within a predetermined range.

11. The color display and solar cell device according to claim 10, wherein the controller sets the switchable transflector layer to the transmissive state when the ambient light intensity is below the predetermined range.

12. The color display and solar cell device according to claim 8, further comprising a tri-color pixelized filter that is arranged in front of the switchable transflector layer, wherein the switchable transflector layer is a switchable broadband transflector and the transparent light source is a white light source, and wherein the controller provides color pixel information to the liquid crystal display when the color display and solar cell device is operated in a reflective mode.

13. The color display and solar cell device according to claim 1, further comprising a controller coupled to the switchable transflector layer and to the transparent light source, wherein the switchable transflector layer is a tri-color selectable transflector and the transparent light source is a tri-color selectable light source, and wherein the controller sequentially provides monochrome sub-frames of color information to the liquid crystal display when the liquid crystal display is on.

14. The color display and solar cell device according to claim 13, wherein the controller synchronously selects corresponding reflective states for the switchable transflector layer at a frame rate of at least 25 per second when the color display and solar cell device is operated in a reflective mode and synchronously selects corresponding colors for the transparent light source at a frame rate of at least 25 per second when the color display and solar cell device is operated in a transmissive mode.

15. The color display and solar cell device according to claim 1, further comprising a controller coupled to the switchable transflector layer and to the transparent light source, wherein the switchable transflector layer is a switchable broadband transflector and the transparent light source is a tri-color selectable light source, and wherein the controller provides gray scale frames of information to the liquid crystal display when the color display and solar cell device is operated in a reflective mode and sequentially provides monochrome sub-frames of color information to the liquid crystal display and synchronously selects corresponding reflective states for the switchable transflector layer at a frame rate of at least 25 per second when the color display and solar cell device is operated in a transmissive mode.

16. The color display and solar cell device according to claim 1, further comprising a controller coupled to the switchable transflector layer and to the transparent light source, wherein the switchable transflector layer is a switchable pixelized tri-color transflector and the transparent light source is a tri-color selectable light source, and wherein the controller provides color pixel information to the liquid crystal display when the liquid crystal display is on and the switchable transflector is in one of a reflective and transmissive state.

17. An apparatus that comprises the color display and solar cell device according to claim 1 and a controller coupled to the switchable transflector.

18. An electronic device, comprising:
a color display and solar cell device, comprising:
a liquid crystal display, comprising
a front plate,
a back plate,
a liquid crystal material between the front and back plates, and
a switchable transflector layer located behind the liquid crystal material;
a transparent light source behind the liquid crystal display; and
a solar cell behind the transparent light source that converts a portion of ambient light energy that is incident on the liquid crystal display into electrical energy; and
battery that is charged by the electrical energy.

19. A method of fabricating a color display and solar cell device, comprising:
disposing a transparent light source behind a liquid crystal display that comprises a front plate, a back plate, a liquid crystal material between the front and back plates,
disposing a switchable transflector layer behind the liquid crystal material; and
disposing a solar cell behind the transparent light source, wherein the solar cell converts a portion of ambient light energy that is incident on the liquid crystal display into electrical energy.

20. A method for fabricating a color display and solar cell device, comprising:
fabricating a liquid crystal display, comprising
disposing liquid crystal material between a front and a back plate, and
disposing a switchable transflector layer behind the liquid crystal material;
disposing a transparent light source behind the liquid crystal display; and
disposing a solar cell behind the transparent light source that converts a portion of ambient light energy that is incident on the liquid crystal display into electrical energy.

* * * * *